US012181140B2

(12) United States Patent
Sawaguchi et al.

(10) Patent No.: US 12,181,140 B2
(45) Date of Patent: Dec. 31, 2024

(54) LIGHT IRRADIATION DEVICE

(71) Applicant: HAMAMATSU PHOTONICS K.K., Hamamatsu (JP)

(72) Inventors: Ryota Sawaguchi, Hamamatsu (JP); Kyoichi Murayama, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 0 days.

(21) Appl. No.: 18/390,881

(22) Filed: Dec. 20, 2023

(65) Prior Publication Data

US 2024/0219017 A1 Jul. 4, 2024

(30) Foreign Application Priority Data

Jan. 4, 2023 (JP) ................................ 2023-000150

(51) Int. Cl.
*F21V 29/58* (2015.01)
*F21Y 105/12* (2016.01)
*F21Y 105/16* (2016.01)

(52) U.S. Cl.
CPC ........... *F21V 29/59* (2015.01); *F21Y 2105/12* (2016.08); *F21Y 2105/16* (2016.08)

(58) Field of Classification Search
CPC ...... F21V 29/503; F21V 29/763; F21V 29/59; B41J 11/00214; B41J 11/00218
See application file for complete search history.

(56) References Cited

U.S. PATENT DOCUMENTS

| | | | | |
|---|---|---|---|---|
| 8,021,023 | B2 * | 9/2011 | Liu | F21V 29/67 362/264 |
| 8,944,638 | B2 * | 2/2015 | Miyazaki | G03B 21/2033 362/345 |
| 11,211,538 | B1 * | 12/2021 | Pikulski | H01L 33/648 |
| 2003/0159307 | A1 | 8/2003 | Sago et al. | |
| 2009/0145581 | A1 | 6/2009 | Hoffman et al. | |
| 2009/0180289 | A1 | 7/2009 | Hsu | |
| 2012/0044678 | A1 * | 2/2012 | Aggarwal | F21V 29/506 362/235 |

(Continued)

FOREIGN PATENT DOCUMENTS

| | | | | |
|---|---|---|---|---|
| CN | 106793709 | * | 5/2017 | H05K 7/20218 |
| CN | 106911058 | * | 6/2017 | H05K 7/20218 |

(Continued)

*Primary Examiner* — Zheng Song
(74) *Attorney, Agent, or Firm* — Faegre Drinker Biddle Reath LLP

(57) ABSTRACT

In a light irradiation device, a cooling section includes first and second plate-shaped portions, a plurality of first wall portions, a plurality of second wall portions, and a frame portion. The first plate-shaped portion is thermally connected to a plurality of light-emitting elements. Each of the first wall portions and each of the second wall portions are alternately disposed. Each of the first and second wall portions, and the frame portion are thermally connected to each of the first and second plate-shaped portions. The plurality of first passage portions in each of the first wall portions are arranged in a second direction, and are biased to the second plate-shaped portion side in a first direction. The plurality of second passage portions in each of the second wall portions are arranged in the second direction, and are biased to the first plate-shaped portion side in the first direction.

11 Claims, 12 Drawing Sheets

(56) References Cited

U.S. PATENT DOCUMENTS

| | | | | | |
|---|---|---|---|---|---|
| 2018/0292739 | A1 * | 10/2018 | Asano | ..................... | F21V 29/54 |

FOREIGN PATENT DOCUMENTS

| | | | | | | |
|---|---|---|---|---|---|---|
| CN | 107672305 | B | | 7/2019 | | |
| EP | 2325556 | A2 | | 5/2011 | | |
| JP | 2010-274256 | A | | 12/2010 | | |
| JP | 2011-146646 | A | | 7/2011 | | |
| JP | 2012-049453 | A | | 3/2012 | | |
| JP | 2013-171911 | A | | 9/2013 | | |
| JP | 2013-229519 | A | | 11/2013 | | |
| JP | 2018-075834 | A | | 5/2018 | | |
| JP | 2020-119989 | A | | 8/2020 | | |
| KR | 2010000346 | | * | 1/2010 | ............... | F21K 9/20 |

* cited by examiner

LIGHT IRRADIATION DEVICE

TECHNICAL FIELD

The present disclosure relates to a light irradiation device.

BACKGROUND

There is known a light irradiation device including a light irradiation section that includes a plurality of light-emitting elements which are two-dimensionally arranged along a plane perpendicular to a predetermined direction, and a cooling section that cools down the plurality of light-emitting elements by circulating a coolant. In the light irradiation device, a flow passage of the coolant in the cooling section meanders along a plane perpendicular to a predetermined direction (for example, refer to Japanese Unexamined Patent Publication No. 2013-229519).

SUMMARY

In the light irradiation device as described above, since a temperature of the coolant rises as going toward a downward side of a flow passage, it is difficult to uniformly cool down a plurality of light-emitting elements. For example, in a case where the light irradiation device as described above is used to dry ink on printed matters, it is very important to uniformly cool down the plurality of light-emitting elements in order to make illuminance of the light-emitting elements uniform.

An object of the present disclosure is to provide a light irradiation device capable of uniformly cooling down a plurality of light-emitting elements.

According to an aspect of the present disclosure, there is provided a light irradiation device including: a light irradiation section including a plurality of light-emitting elements which are two-dimensionally arranged along a plane perpendicular to a first direction; and a cooling section that includes an inlet port and an outlet port and cools down the plurality of light-emitting elements by circulating a coolant from the inlet port to the outlet port. The cooling section includes a first plate-shaped portion that is thermally connected to the plurality of light-emitting elements, a second plate-shaped portion that faces the first plate-shaped portion in the first direction, a plurality of first wall portions which extend between the first plate-shaped portion and the second plate-shaped portion in a second direction perpendicular to the first direction, and are arranged in a third direction perpendicular to both the first direction and the second direction, a plurality of second wall portions which extend between the first plate-shaped portion and the second plate-shaped portion in the second direction, and are arranged in the third direction, and a frame portion that surrounds the plurality of first wall portions and the plurality of second wall portions between the first plate-shaped portion and the second plate-shaped portion. The inlet port is disposed on one side in the third direction with respect to the plurality of first wall portions and the plurality of second wall portions, the outlet port is disposed on the other side in the third direction with respect to the plurality of first wall portions and the plurality of second wall portions, each of the plurality of first wall portions and each of the plurality of second wall portions are alternately disposed in a state of being spaced apart from each other, each of the plurality of first wall portions is thermally connected to each of the first plate-shaped portion and the second plate-shaped portion, each of the plurality of second wall portions is thermally connected to each of the first plate-shaped portion and the second plate-shaped portion, the frame portion is thermally connected to each of the first plate-shaped portion and the second plate-shaped portion, each of the plurality of first wall portions includes a plurality of first passage portions through which the coolant passes, each of the plurality of second wall portions includes a plurality of second passage portions through which the coolant passes, the plurality of first passage portions are arranged in the second direction and are biased to the second plate-shaped portion side in the first direction, and the plurality of second passage portions arranged in the second direction and are biased to the first plate-shaped portion side in the first direction.

DETAILED DESCRIPTION

Figure 1:
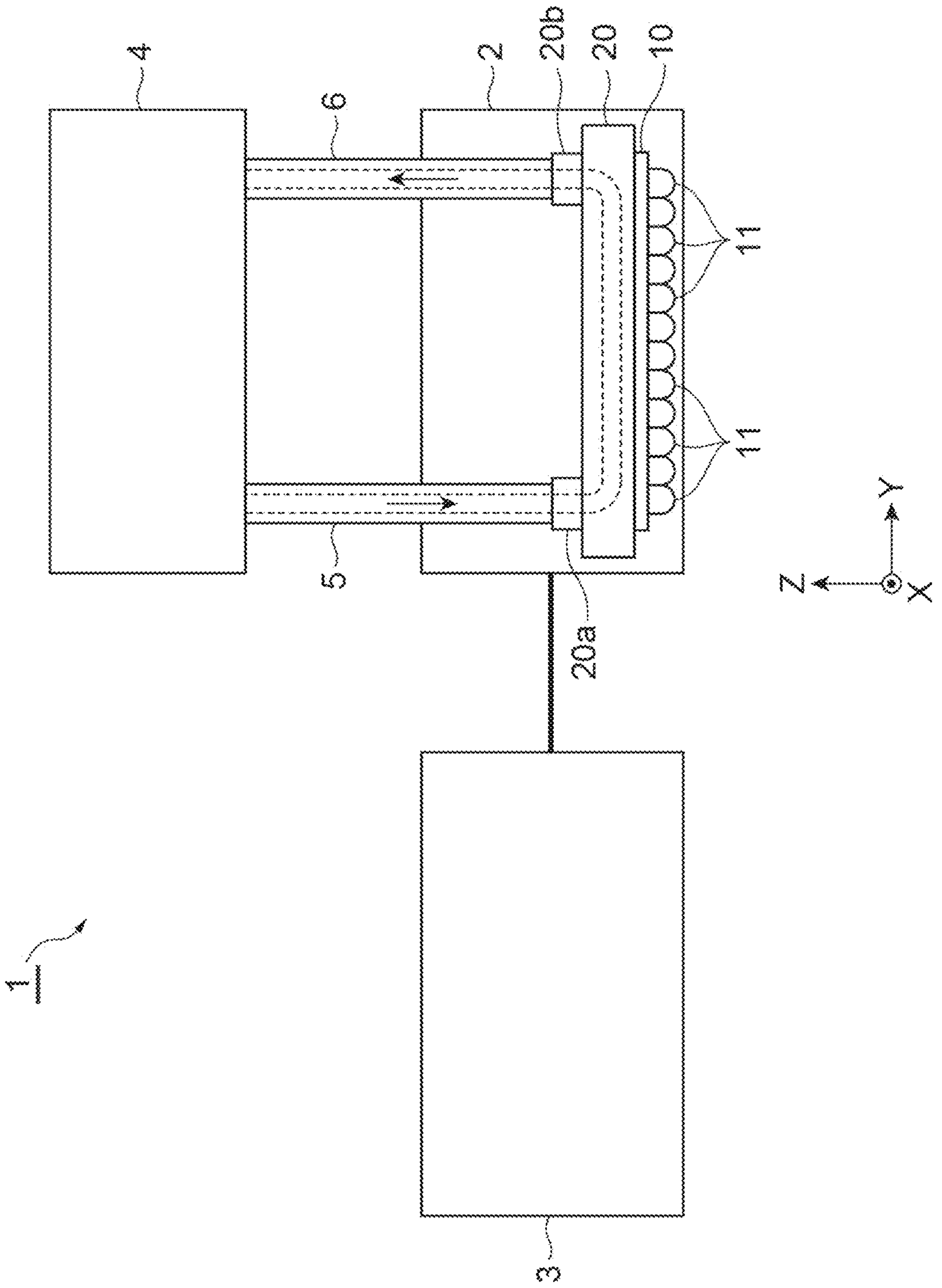
FIG. 1 is a configuration diagram of a light irradiation device of an embodiment.

Hereinafter, an embodiment of the present disclosure will be described in detail with reference to the drawings. Note that, in the drawings, the same reference numeral will be given to the same or equivalent portions, and redundant description will be omitted.

As illustrated in FIG. 1, a light irradiation device 1 includes a light irradiation unit 2, a power supply unit 3, and a chiller 4. The light irradiation unit 2 includes a light irradiation section 10 and a cooling section 20. The light irradiation section 10 includes a plurality of light-emitting elements 11 which are two-dimensionally arranged along a plane perpendicular to a Z-direction (a first direction). The cooling section 20 has an inlet port 20*a* and an outlet port 20*b*. The cooling section 20 cools down the plurality of light-emitting elements 11 by circulating a coolant from the inlet port 20*a* to the outlet port 20*b*. The power supply unit 3 is electrically connected to the light irradiation section 10. The power supply unit 3 supplies electric power to the light irradiation section 10. The chiller 4 is connected to the inlet port 20*a* of the cooling section 20 through a pipeline 5, and is connected to the outlet port 20*b* of the cooling section 20 through a pipeline 6. The chiller 4 circulates and supplies the coolant to the cooling section 20 while cooling down the coolant. As an example, with respect to printed matters conveyed along a plane perpendicular to the Z-direction, the light irradiation device 1 is used to dry ink on the printed matters by irradiating the printed matters with ultraviolet rays emitted from the plurality of light-emitting elements 11.

Figure 2:
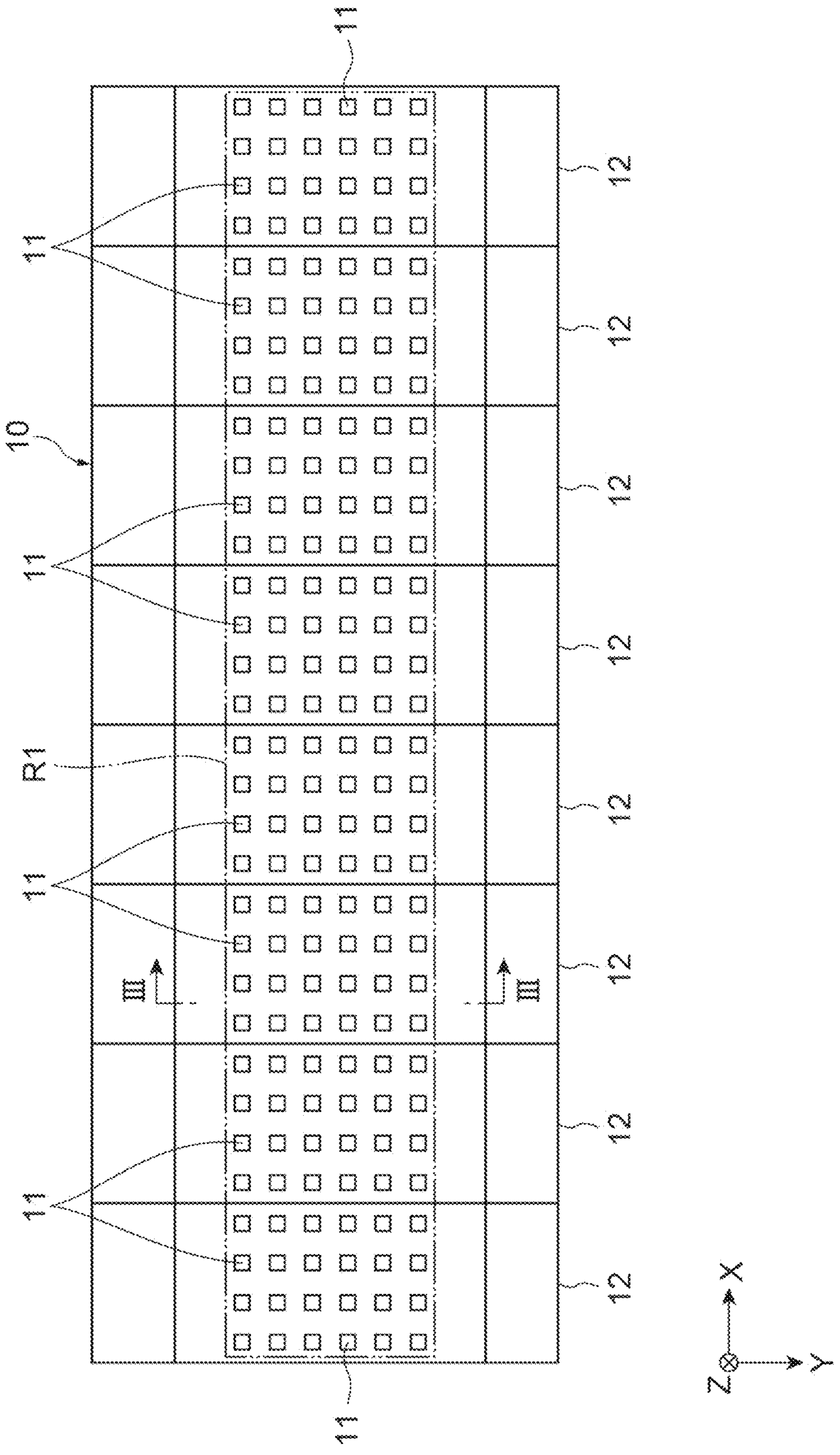
FIG. 2 is a bottom view of a light irradiation section shown in FIG. 1.

As illustrated in FIG. 2, in the light irradiation section 10, the plurality of light-emitting elements 11 are supported by a plurality of bases 12. For example, each of the light-emitting elements 11 is an LED element that emits ultra-violet rays. The plurality of bases 12 are arranged in an X-direction (a second direction perpendicular to the first direction). For example, each of the bases 12 is formed in a rectangular plate shape in which the Z-direction is set as a thickness direction. Each of the bases 12 is formed from a material (for example, copper, aluminum, aluminum nitride, or the like) having excellent thermal conductivity. In each of the bases 12, for example, the plurality of light-emitting elements 11 are arranged in a matrix shape in which the X-direction is set as a row direction, and a Y-direction (a third direction perpendicular to both the first direction and the second direction) is set as a column direction. A region R1 where the plurality of light-emitting elements 11 are arranged has, for example, a rectangular shape in which the X-direction is set as a long side direction.

Figure 3:
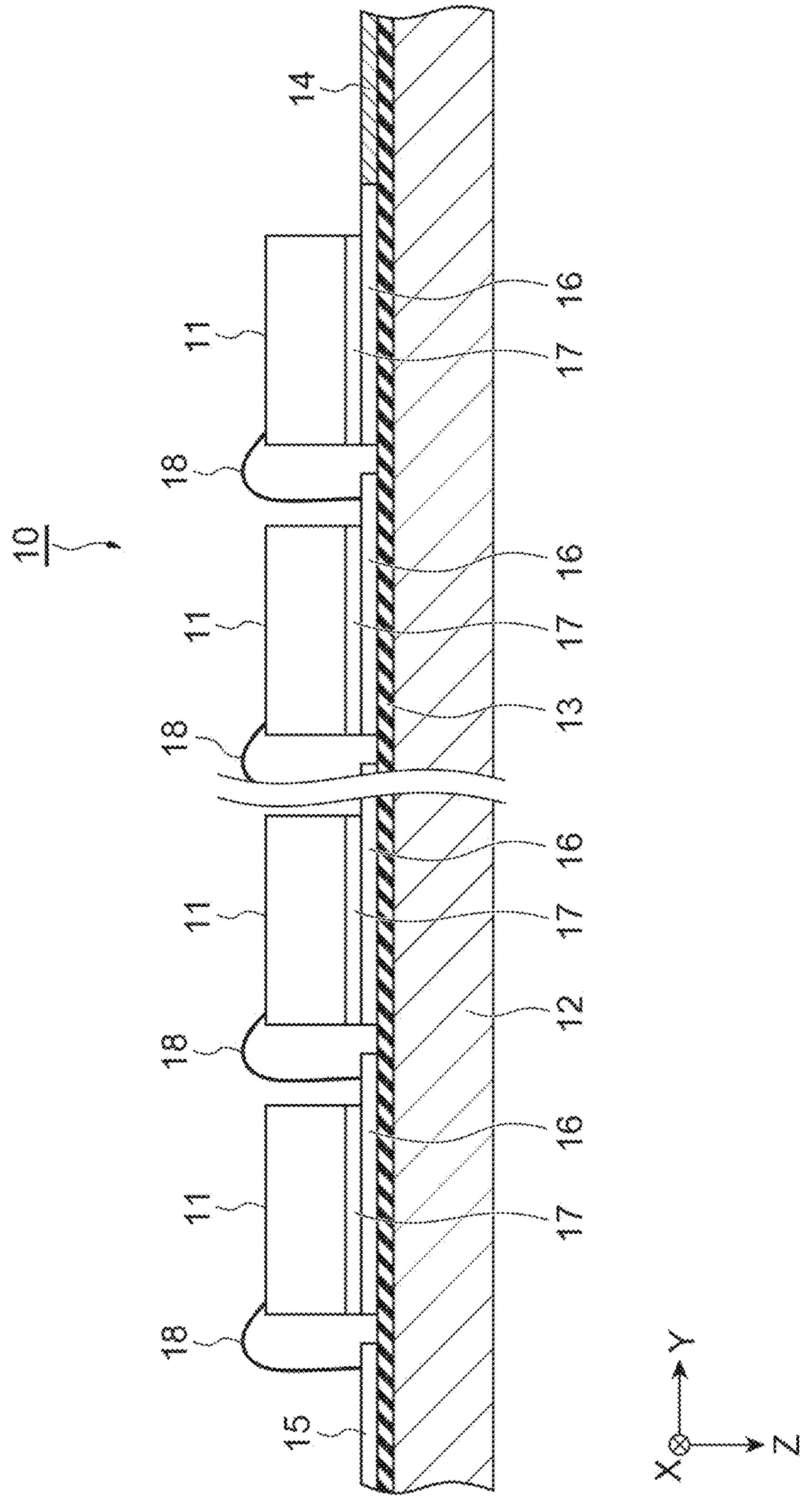
FIG. 3 is a cross-sectional view of the light irradiation section along a line III-III shown in FIG. 2.

An example of a configuration of the light irradiation section 10 will be described in more detail. FIG. 3 is a cross-sectional view of the light irradiation section 10 along a line III-III shown in FIG. 2. As illustrated in FIG. 3, an insulation layer 13 is formed on the base 12, and a first electrode pattern 14, a second electrode pattern 15, and a plurality of mounting patterns 16 are formed on the insula-tion layer 13. The first electrode pattern 14 and the second electrode pattern 15 extend in the X-direction, respectively. The plurality of mounting patterns 16 are arranged between the first electrode pattern 14 and the second electrode pattern 15 in a matrix shape in which the X-direction is set as a row direction and the Y-direction is set as a column direction. Among the plurality of mounting patterns 16, a plurality of mounting patterns 16 arranged in the X-direction in a state of being adjacent to the first electrode pattern 14 are formed integrally with the first electrode pattern 14.

Each of the light-emitting elements 11 is disposed on each of the mounting patterns 16 through a joining layer 17. For example, the joining layer 17 is a solder layer, and joins an anode of the light-emitting element 11 and the mounting pattern 16. When focusing on a pair of light-emitting ele-ments 11 adjacent to each other, a wire 18 is laid between a cathode of a light-emitting element 11 on the first electrode pattern 14 side and a mounting pattern 16 on which a light-emitting element 11 on the second electrode pattern 15 side is disposed. With regard to a light-emitting element 11 adjacent to the second electrode pattern, a wire 18 is laid between a cathode of the light-emitting element 11 and the second electrode pattern 15. The power supply unit 3 (refer to FIG. 1) supplies electric power to the plurality of light-emitting elements 11 through the first electrode pattern 14 and the second electrode pattern 15 and turns on the plurality of light-emitting elements 11. Note that, the joining layer 17 may be a layer formed from a metal joining material such as a brazing material without limitation to the solder layer. In addition, each of the light-emitting elements 11 may be mounted on each of the mounting patterns 16 by a joining method such as bump joining.

Figure 4:
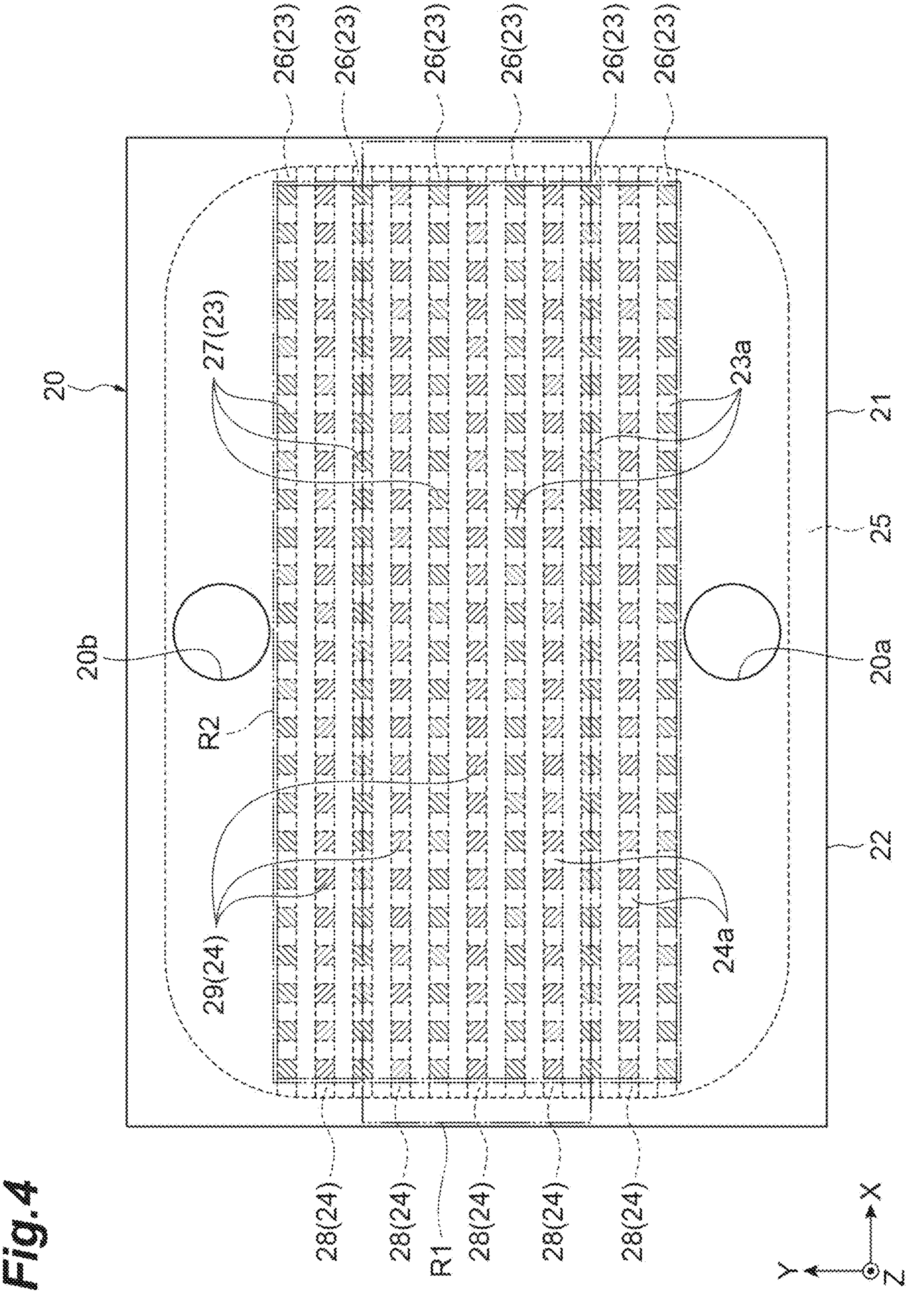
FIG. 4 is a plan view of a cooling section shown in FIG. 1.
Figure 5:
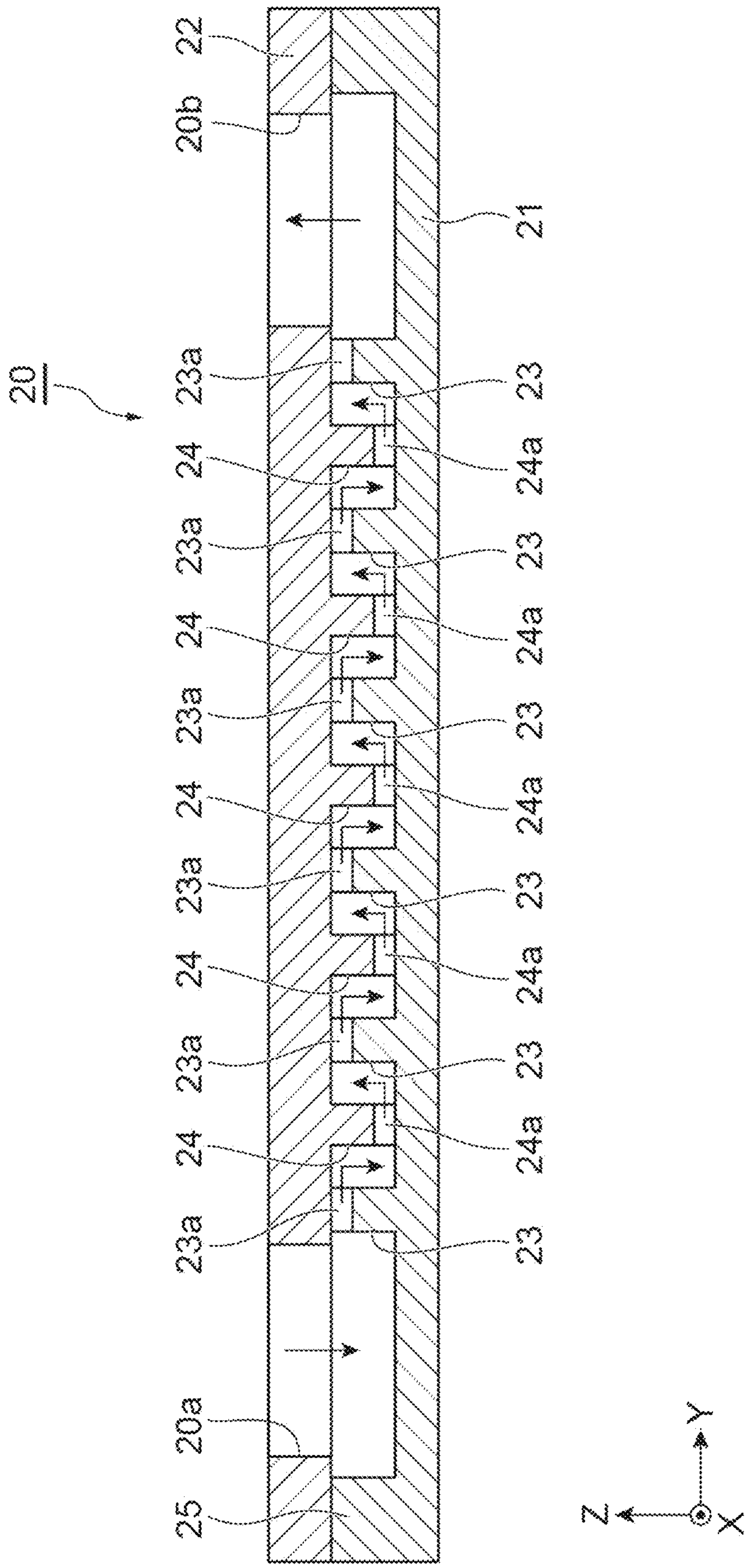
FIG. 5 is a cross-sectional view of the cooling section along a plane perpendicular to an X-direction shown in FIG. 4.

As illustrated in FIG. 4 and FIG. 5, the cooling section 20 includes a first plate-shaped portion 21, a second plate-shaped portion 22, a plurality of first wall portions 23, a plurality of second wall portions 24, and a frame portion 25. The first plate-shaped portion 21, the second plate-shaped portion 22, the plurality of first wall portions 23, the plurality of second wall portions 24, and the frame portion 25 are formed from a material (for example, copper, aluminum, or the like) excellent in thermal conductivity and workability in a solid type.

The first plate-shaped portion 21 and the second plate-shaped portion 22 face each other in the Z-direction. For example, the first plate-shaped portion 21 and the second plate-shaped portion 22 are formed in a rectangular plate shape in which the Z-direction is set as a thickness direction, and the X-direction is set as a long side direction. The thickness of the second plate-shaped portion 22 is larger than the thickness of the first plate-shaped portion 21. The first plate-shaped portion 21 is thermally connected to the plu-rality of light-emitting elements 11 (refer to FIG. 3). More specifically, the first plate-shaped portion 21 is thermally connected to the plurality of light-emitting elements 11 by bringing the plurality of bases 12 (refer to FIG. 3) into contact with the first plate-shaped portion 21 from a side opposite to the second plate-shaped portion 22. A heat conductive member such as thermal grease may be disposed between the first plate-shaped portion 21 and the bases 12. Note that, in FIG. 4, a plurality of first protrusions 27 and a plurality of second protrusions 29 to be described later are hatched from the viewpoint of visibility.

Each of the first wall portions 23 extends between the first plate-shaped portion 21 and the second plate-shaped portion 22 in the X-direction. The plurality of first wall portions 23 are arranged between the first plate-shaped portion 21 and the second plate-shaped portion 22 in the Y-direction. Each of the second wall portions 24 extends between the first plate-shaped portion 21 and the second plate-shaped portion 22 in the X-direction. The plurality of second wall portions 24 are arranged between the first plate-shaped portion 21 and the second plate-shaped portion 22 in the Y-direction. The first wall portions 23 and the second wall portions 24 are alternately disposed in a state of being spaced apart from each other. The frame portion 25 surrounds the plurality of first wall portions 23 and the plurality of second wall portions 24 between the first plate-shaped portion 21 and the second plate-shaped portion 22. For example, the frame portion 25 is formed in a rectangular frame shape in which the X-direction is set as a long side direction. Each corner of an inner side surface in the frame portion 25 is chamfered in a round shape. As an example, the height of the first wall portions 23 in the Z-direction, the height of the second wall portions 24 in the Z-direction, and the height of the frame portion 25 in the Z-direction are substantially equal to each other.

The inlet port 20*a* is disposed on one side in the Y-direc-tion with respect to the plurality of first wall portions 23 and the plurality of second wall portions 24. The outlet port 20*b* is disposed on the other side in the Y-direction with respect to the plurality of first wall portions 23 and the plurality of second wall portions 24. In this embodiment, the inlet port 20*a* and the outlet port 20*b* are formed in the second plate-shaped portion 22 to face the first plate-shaped portion 21 in the Z-direction. The inlet port 20*a* and the outlet port 20*b* are arranged in the Y-direction at the center of the frame portion 25 in the X-direction when viewed in the Z-direc-tion.

Each of the first wall portions 23 has a plurality of first passage portions 23*a* through which a coolant passes. Each of the second wall portions 24 has a plurality of second passage portions 24*a* through which the coolant passes. The plurality of first passage portions 23*a* are arranged in the X-direction and are biased to the second plate-shaped portion 22 side in the Z-direction. That is, the center of each of the first passage portions 23*a* in the Z-direction is located on the second plate-shaped portion 22 side with respect to the center of each of the first wall portions 23 in the Z-direction. The plurality of second passage portions 24*a* are arranged in the X-direction and are biased to the first plate-shaped portion 21 side in the Z-direction. That is, the center of each of the second passage portions 24*a* in the Z-direction is located on the first plate-shaped portion 21 side with respect to the center of each of the second wall portions 24 in the Z-direction.

Figure 6:
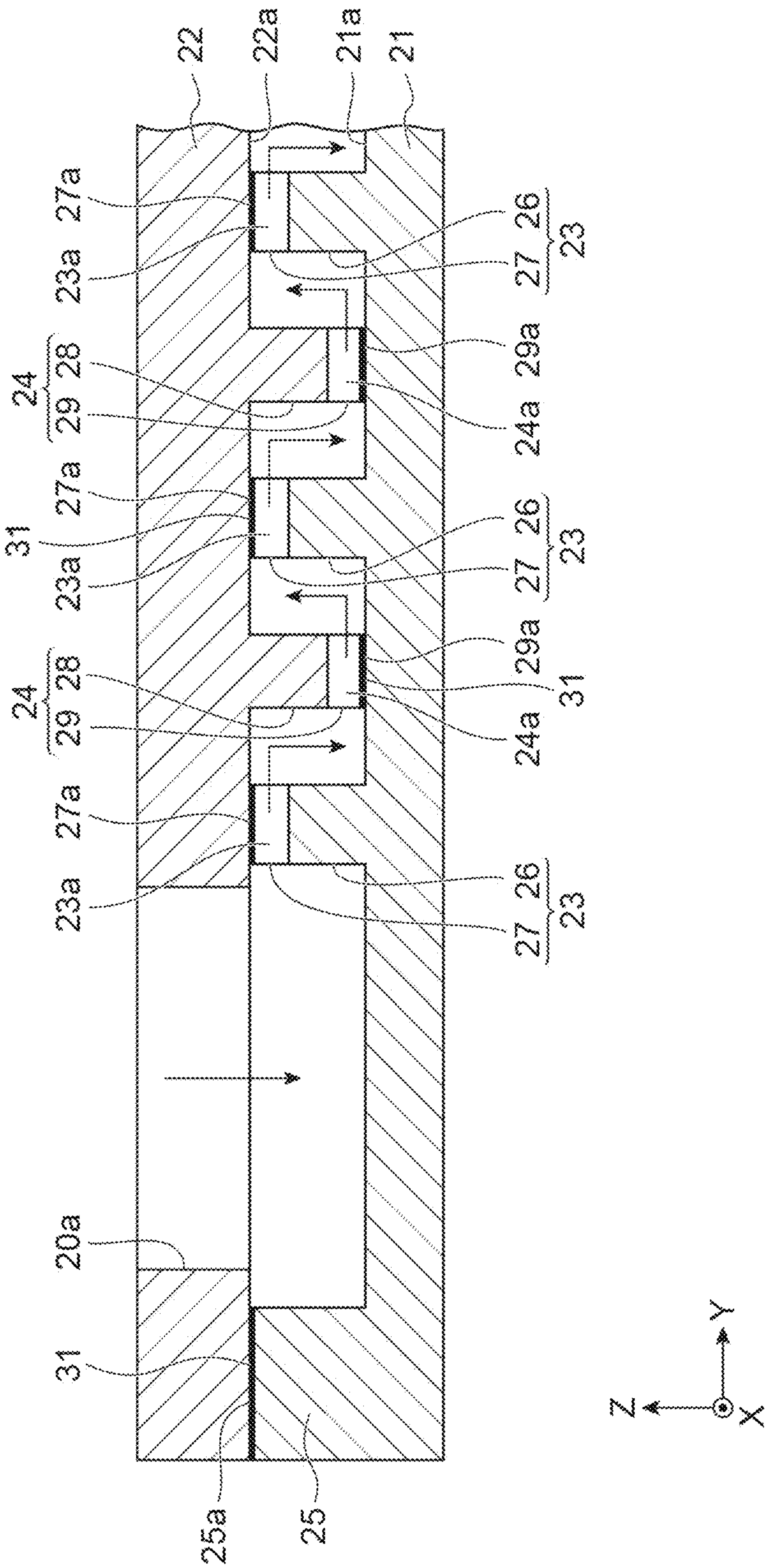
FIG. 6 is a cross-section view of a part of the cooling section along the plane perpendicular to the X-direction shown in FIG. 4.
Figure 7:
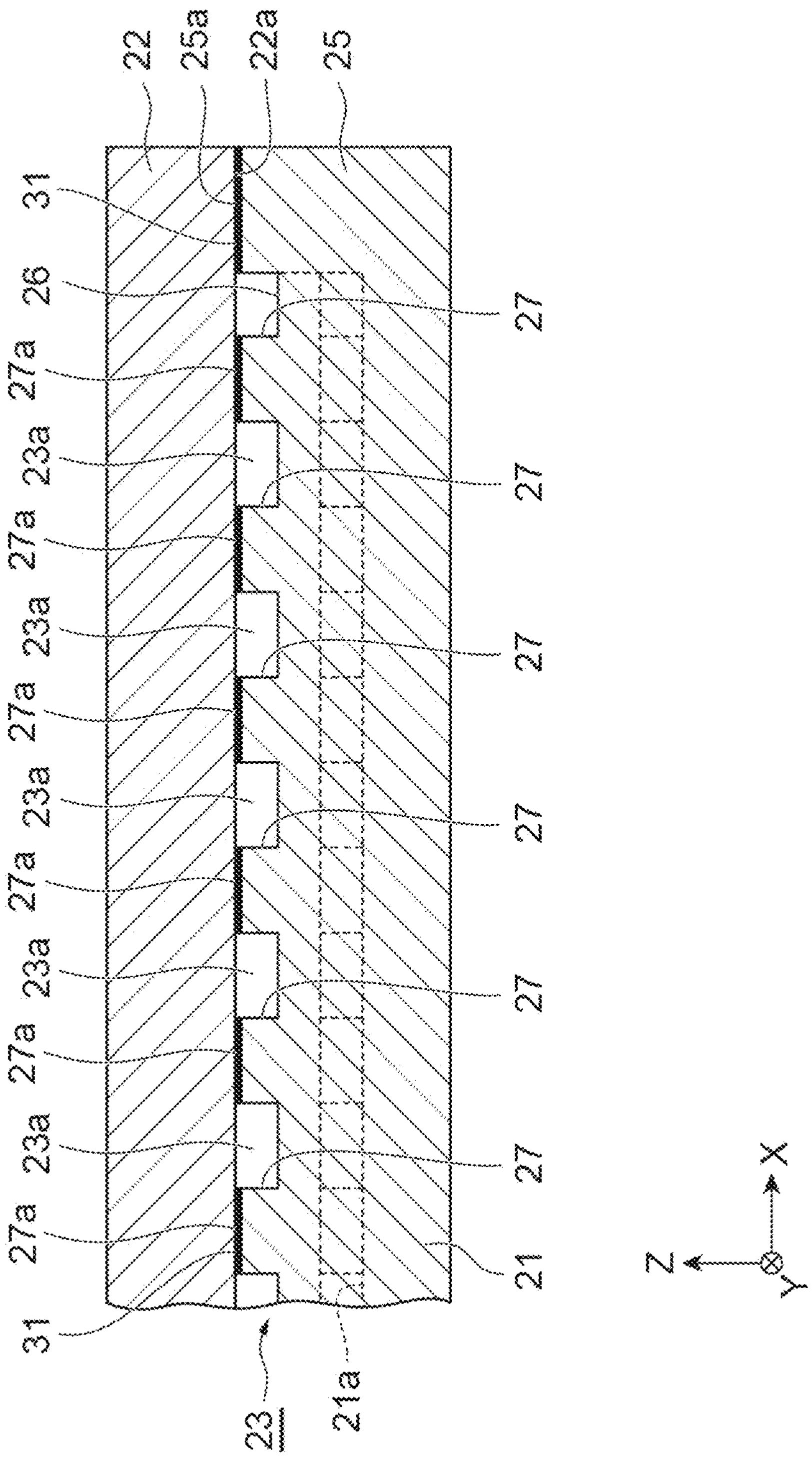
FIG. 7 is a cross-sectional view of a part of a first wall portion along a plane perpendicular to a Y-direction shown in FIG. 4.

As illustrated in FIG. 4, FIG. 6, and FIG. 7, each of the first wall portions 23 includes a first main body portion 26 and the plurality of first protrusions 27. The first main body portion 26 extends in the X-direction. The plurality of first protrusions 27 are arranged in the X-direction. Each of the first protrusions 27 protrudes from the first main body portion 26 to the second plate-shaped portion 22 side, and is formed in a square column shape. Each of the first passage portions 23*a* is a region between a pair of adjacent first protrusions 27. The first main body portion 26 and the plurality of first protrusions 27 are formed integrally with the first plate-shaped portion 21. According to this, the first main body portion 26 is thermally connected to the first plate-shaped portion 21. Each of the first protrusions 27 is joined to the second plate-shaped portion 22 with a brazing material 31. The brazing material 31 is disposed between a top surface 27*a* of each of the first protrusions 27 and a surface 22*a* of the second plate-shaped portion 22 on the first plate-shaped portion 21 side. According to this, each of the first protrusions 27 is thermally connected to the second plate-shaped portion 22. That is, each of the first wall portions 23 is thermally connected to each of the first plate-shaped portion 21 and the second plate-shaped portion 22. In each of the first wall portions 23, first passage portions 23*a* located at both ends among the plurality of first passage portions 23*a* arranged in the X-direction face the frame portion 25. That is, in each of the first passage portions 23*a* located at both ends, an inner surface of the frame portion 25 is exposed to the first passage portion 23*a*.

Figure 8:
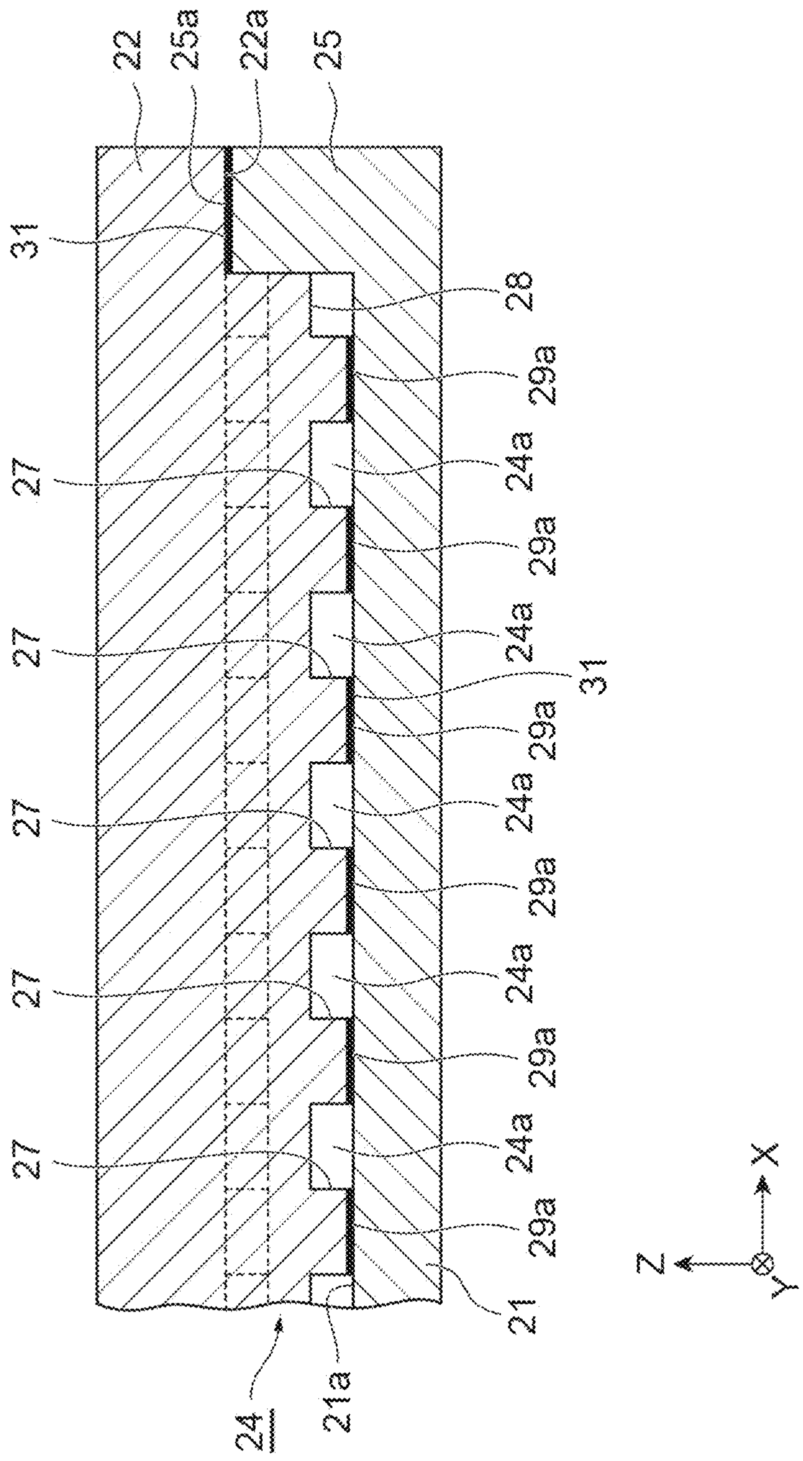
FIG. 8 is a cross-sectional view of a part of a second wall portion along the plane perpendicular to the Y-direction shown in FIG. 4.

As illustrated in FIG. 4, FIG. 6, and FIG. 8, each of the second wall portions 24 includes a second main body portion 28, and the plurality of second protrusions 29. The second main body portion 28 extends in the X-direction. The plurality of second protrusions 29 are arranged in the X-direction. Each of the second protrusions 29 protrudes from the second main body portion 28 toward the first plate-shaped portion 21 side, and is formed in a square column shape. Each of the second passage portions 24*a* is a region between a pair of adjacent second protrusions 29. The second main body portion 28 and the plurality of second protrusions 29 are formed integrally with the second plate-shaped portion 22. According to this, the second main body portion 28 is thermally connected to the second plate-shaped portion 22. Each of the second protrusions 29 is joined to the first plate-shaped portion 21 with the brazing material 31. The brazing material 31 is disposed between a top surface 29*a* of each of the second protrusions 29, and a surface 21*a* of the first plate-shaped portion 21 on the second plate-shaped portion 22 side. According to this, each of the second protrusions 29 is thermally connected to the first plate-shaped portion 21. That is, each of the second wall portions 24 is thermally connected to each of the first plate-shaped portion 21 and the second plate-shaped portion 22. In each of the second wall portions 24, second passage portions 24*a* located at both ends among the plurality of second passage portions 24*a* arranged in the X-direction is face the frame portion 25. That is, in each of the second passage portions 24*a* located at both ends, an inner surface of the frame portion 25 is exposed to the second passage portions 24*a*.

The frame portion 25 is formed integrally with the first plate-shaped portion 21. The frame portion 25 is joined to the second plate-shaped portion 22 with the brazing material 31. The brazing material 31 is disposed between a surface 25*a* of the frame portion 25 on the second plate-shaped portion 22 side, and the surface 22*a* of the second plate-shaped portion 22. According to this, the frame portion 25 is thermally connected to each of the first plate-shaped portion 21 and the second plate-shaped portion 22. Note that, both ends of each of a plurality of the first main body portions 26 and both ends of each of a plurality of the second main body portions 28 are connected to the frame portion 25.

As illustrated in FIG. 4, the first passage portions 23*a* and the second passage portions 24*a* are linearly and alternately arranged along a line parallel to the Y-direction when viewed in the Z-direction. An arrangement pitch of the plurality of first passage portions 23*a* in the X-direction, and an arrangement pitch of the plurality of second passage portions 24*a* in the X-direction are substantially equal to each other. As illustrated in FIG. 5, when viewed in the X-direction, the first passage portions 23*a* and the second passage portions 24*a* are alternately arranged in a zigzag shape along a line parallel to the Y-direction. As illustrated in FIG. 4 and FIG. 5, in the light irradiation device 1, the inlet port 20*a* is formed in the second plate-shaped portion 22, and among the plurality of first wall portions 23 and the plurality of second wall portions 24, a wall portion closest to the inlet port 20*a* in the Y-direction is one of the first wall portions 23. As illustrated in FIG. 4, when viewed in the Z-direction, the region R1 where the plurality of light-emitting elements 11 are disposed is included in a region R2 where the plurality of first wall portions 23 and the plurality of second wall portions 24 are disposed at least in the Y-direction. In this embodiment, when viewed in the Z-direction, some light-emitting elements 11 among the plurality of light-emitting elements 11 overlap the frame portion 25.

As an example, when viewed in the Z-direction, an outer edge of the first plate-shaped portion 21, an outer edge of the second plate-shaped portion 22, and an outer edge of the frame portion 25 match each other. As an example, in the first plate-shaped portion 21, the second plate-shaped portion 22, the plurality of first wall portions 23, the plurality of second wall portions 24, and the frame portion 25, a corrosion prevention layer such as an Ni-plated film is provided on a surface exposed to the coolant. As an example, thermal conductivity of a material constituting the brazing material 31 is higher than thermal conductivity of materials constituting the first plate-shaped portion 21, the second plate-shaped portion 22, the plurality of first wall portions 23, the plurality of second wall portions 24, and the frame portion 25.

In the light irradiation device 1 configured as described above, the coolant is circulated and supplied to the cooling section 20 by the chiller 4 while the plurality of light-emitting elements 11 are turned on by supplying electric power from the power supply unit 3 to the light irradiation section 10. According to this, in the cooling section 20, the coolant flows in from the inlet port 20*a*, passes through the plurality of first passage portions 23*a* and the plurality of second passage portions 24*a*, and flows out from the outlet port 20*b*. At this time, as indicated by an arrow in FIG. 5, a flow direction of the coolant can be changed in a zigzag shape in the Z-direction. Heat generated by the plurality of light-emitting elements 11 is transferred to the first plate-shaped portion 21 through the base 12, and is transferred to the coolant while moving from the first plate-shaped portion 21 side to the second plate-shaped portion 22 side through each of the first wall portions 23, each of the second wall portions 24, and the frame portion 25. In this manner, heat generated by the plurality of light-emitting elements 11 is removed.

As described above, in the light irradiation device 1, the first wall portions 23 and the second wall portions 24 are alternately disposed in a state of being spaced apart from each other between the first plate-shaped portion 21 and the second plate-shaped portion 22 and on an inner side of the frame portion 25. In each of the first wall portions 23, the plurality of first passage portions 23*a* are biased to the second plate-shaped portion 22 side, and in each of the second wall portions 24, the plurality of second passage portions 24*a* are biased to the first plate-shaped portion 21 side. According to this, a flow velocity of the coolant from the inlet port 20*a* to the outlet port 20*b* becomes uniform, and as a result, a cooling effect by the cooling section 20 becomes uniform along a plane perpendicular to the Z-direction. In addition, since the flow direction of the coolant can be changed in a zigzag shape in the Z-direction, a contact area with the coolant in the cooling section 20 increases, and turbulence is likely to occur in the flow of the coolant. As a result, cooling efficiency by the cooling section 20 is improved. In addition, in the light irradiation device 1, each of the first wall portions 23, each of the second wall portions 24, and the frame portion 25 are thermally connected to each of the first plate-shaped portion 21 and the second plate-shaped portion 22. According to this, heat generated by the plurality of light-emitting elements 11 is easily transferred from the first plate-shaped portion 21 side to the second plate-shaped portion 22 side through each of the first wall portions 23, each of the second wall portions 24, and the frame portion 25. As a result, the cooling efficiency by the cooling section 20 is improved. As described above, according to the light irradiation device 1, it is possible to uniformly cool down the plurality of light-emitting elements 11.

In the light irradiation device 1, each of the first wall portions 23 includes the first main body portion 26 that is thermally connected to the first plate-shaped portion 21, and the plurality of first protrusions 27 which are thermally connected to the second plate-shaped portion 22. Each of the first passage portions 23*a* is a region between a pair of adjacent first protrusions 27. In addition, each of the second wall portions 24 includes the second main body portion 28 that is thermally connected to the second plate-shaped portion 22, and the plurality of second protrusions 29 which are thermally connected to the first plate-shaped portion 21, and each of the second passage portions 24*a* is a region between a pair of adjacent second protrusions 29. According to this, it is possible to realize a configuration in which the plurality of first passage portions 23*a* in each of the first wall portions 23 are biased to the second plate-shaped portion 22 side, and the plurality of second passage portions 24*a* in each of the second wall portions 24 are biased to the first plate-shaped portion 21 side with a simple structure.

In the light irradiation device 1, the first main body portion 26 and the plurality of first protrusions 27 are formed integrally with the first plate-shaped portion 21, and each of the first protrusion 27 is joined to the second plate-shaped portion 22 with the brazing material 31. In addition, the second main body portion 28 and the plurality of second protrusions 29 are formed integrally with the second plate-shaped portion 22, and each of the second protrusions 29 is joined to the first plate-shaped portion 21 with the brazing material 31. In addition, the frame portion 25 is formed integrally with the first plate-shaped portion 21, and is joined to the second plate-shaped portion 22 with the brazing material 31. According to this, it is possible to realize a configuration in which each of the first wall portions 23, each of the second wall portions 24, and the frame portion 25 are thermally connected to each of the first plate-shaped portion 21 and the second plate-shaped portion 22 with a simple structure. In addition, it is possible to efficiently and reliably transfer heat generated by the plurality of light-emitting elements 11 from the first plate-shaped portion 21 side to the second plate-shaped portion 22 side through each of the first wall portions 23, each of the second wall portions 24, and the frame portion 25.

In the light irradiation device 1, each of the first protrusions 27 and each of the second protrusions 29 are formed in a square column shape. According to this, since turbulence is likely to occur in a flow of the coolant, it is possible to improve the cooling efficiency by the cooling section 20. In addition, it is possible to easily manufacture the cooling section 20.

In the light irradiation device 1, the thickness of the second plate-shaped portion 22 is larger than the thickness of the first plate-shaped portion 21. According to this, since heat capacity of the second plate-shaped portion 22 becomes larger than heat capacity of the first plate-shaped portion 21, heat generated by the plurality of light-emitting elements 11 can be efficiently and reliably transferred from the first plate-shaped portion 21 to the second plate-shaped portion 22.

In the light irradiation device 1, when viewed in the Z-direction, the region R1 where the plurality of light-emitting elements 11 are disposed is included in the region R2 where the plurality of first wall portions 23 and the plurality of second wall portions 24 are disposed at least in the Y-direction. According to this, it is possible to efficiently and uniformly cool down the plurality of light-emitting elements 11.

In the light irradiation device 1, the inlet port 20*a* is formed in the second plate-shaped portion 22 to face the first plate-shaped portion 21 in the Z-direction. According to this, since the coolant flowing in from the inlet port 20*a* flows so as to collide with the first plate-shaped portion 21, it is possible to cool down the plurality of light-emitting elements 11 with further efficiency.

In the light irradiation device 1, the first passage portions 23*a* located at both ends among the plurality of first passage portions 23*a* arranged in the X-direction, and the second passage portions 24*a* located at both ends among the plurality of second passage portions 24*a* arranged in the X-direction face the frame portion 25. According to this, it is possible to effectively transfer heat generated by the plurality of light-emitting elements 11 from the frame portion 25 to the coolant.

In the light irradiation device 1, when viewed in the Z-direction, some light-emitting elements 11 among the plurality of light-emitting elements 11 overlap the frame portion 25. According to this, it is possible to broaden a light-emitting area of the light irradiation section 10 by broadening the region R1 where the plurality of light-emitting elements 11 are disposed. In addition, it is possible to increase light-emission intensity of the light irradiation section 10 as a whole by increasing an arrangement density of the plurality of light-emitting elements 11. In addition, in a case where a plurality of the light irradiation sections 10 are arranged in an array shape, since a region where the light-emitting elements 11 are sparsely arranged is less likely to occur between the light irradiation sections 10 adjacent to each other, it is possible to obtain a uniform light-emission plane of the plurality of light irradiation sections 10 as a whole.

In the light irradiation device 1, the inlet port 20*a* is formed in the second plate-shaped portion 22, and among the plurality of first wall portions 23 and the plurality of second wall portions 24, a wall portion closest to the inlet port 20*a* in the Y-direction is one of the first wall portions 23. According to this, when the coolant flowing in from the inlet port 20*a* formed in the second plate-shaped portion 22 heads toward the plurality of first passage portions 23*a* provided in the first wall portion 23 closest to the inlet port 20*a*, since a flow direction of the coolant can be greatly changed, and a flow velocity of the coolant becomes uniform in the X-direction, it is possible to more uniformly cool down the plurality of light-emitting elements 11.

The present disclosure is not limited to the above-described embodiment. For example, the light irradiation device 1 may include the light irradiation unit 2 and the power supply unit 3 and may not include the chiller 4. In this case, the chiller 4 is prepared as an external configuration. Alternatively, the light irradiation device 1 may include the light irradiation unit 2 and may not include the power supply unit 3 and the chiller 4. In this case, the power supply unit 3 and the chiller 4 are prepared as an external configuration. In addition, the light irradiation unit 2 may include the chiller 4 as an internal configuration. In addition, each of the light-emitting elements 11 may be an element that emits light having a wavelength other than ultraviolet rays.

The inlet port 20*a* may not be formed in the second plate-shaped portion 22 so as to face the first plate-shaped portion 21 in the Z-direction. As an example, the inlet port 20*a* may be formed in the frame portion 25, or may be formed in the first plate-shaped portion 21 so as to face the second plate-shaped portion 22 in the Z-direction. Similarly, the outlet port 20*b* may not be formed in the second plate-shaped portion 22 so as to face the first plate-shaped portion 21 in the Z-direction. As an example, the outlet port 20*b* may be formed in the frame portion 25, or may be formed in the first plate-shaped portion 21 so as to face the second plate-shaped portion 22 in the Z-direction. In addition, the cooling section 20 may include a plurality of the inlet ports 20*a*. Similarly, the cooling section 20 may include a plurality of the outlet port 20*b*. In addition, the thickness of the second plate-shaped portion 22 may be equal to the thickness of the first plate-shaped portion 21, or may be smaller than the thickness of the first plate-shaped portion 21.

The plurality of first passage portions 23*a* may not be the region between the pair of adjacent first protrusions 27 as long as the plurality of first passage portions 23*a* are arranged in the X-direction and are biased to the second plate-shaped portion 22 side in the Z-direction. Similarly, the plurality of second passage portions 24*a* may not be the region between the pair of adjacent second protrusions 29 as long as the plurality of second passage portions 24*a* are arranged in the X-direction and are biased to the first plate-shaped portion 21 side in the Z-direction.

Each of the first wall portions 23 may be formed separately from the first plate-shaped portion 21 or may be formed integrally with the second plate-shaped portion 22 as long as the first wall portion 23 is thermally connected to each of the first plate-shaped portion 21 and the second plate-shaped portion 22. Similarly, each of the second wall portions 24 may be formed integrally with the first plate-shaped portion 21 or may be formed separately from the second plate-shaped portion 22 as long as the second wall portion 24 is thermally connected to each of the first plate-shaped portion 21 and the second plate-shaped portion 22.

The frame portion 25 may be formed separately from the first plate-shaped portion 21 or may be formed integrally with the second plate-shaped portion 22 as long as the frame portion 25 is thermally connected to each of the first plate-shaped portion 21 and the second plate-shaped portion 22. As an example, the frame portion 25 may be formed integrally with the second plate-shaped portion 22, and may be joined to the first plate-shaped portion 21 with the brazing material 31.

When viewed in the Z-direction, the region R1 where the plurality of light-emitting elements 11 are disposed may be included in the region R2 where the plurality of first wall portions 23 and the plurality of second wall portions 24 are disposed not only in the Y-direction but also in the X-direction. That is, the entirety of the region R1 may be included in the region R2 when viewed in the Z-direction.

Figure 9:
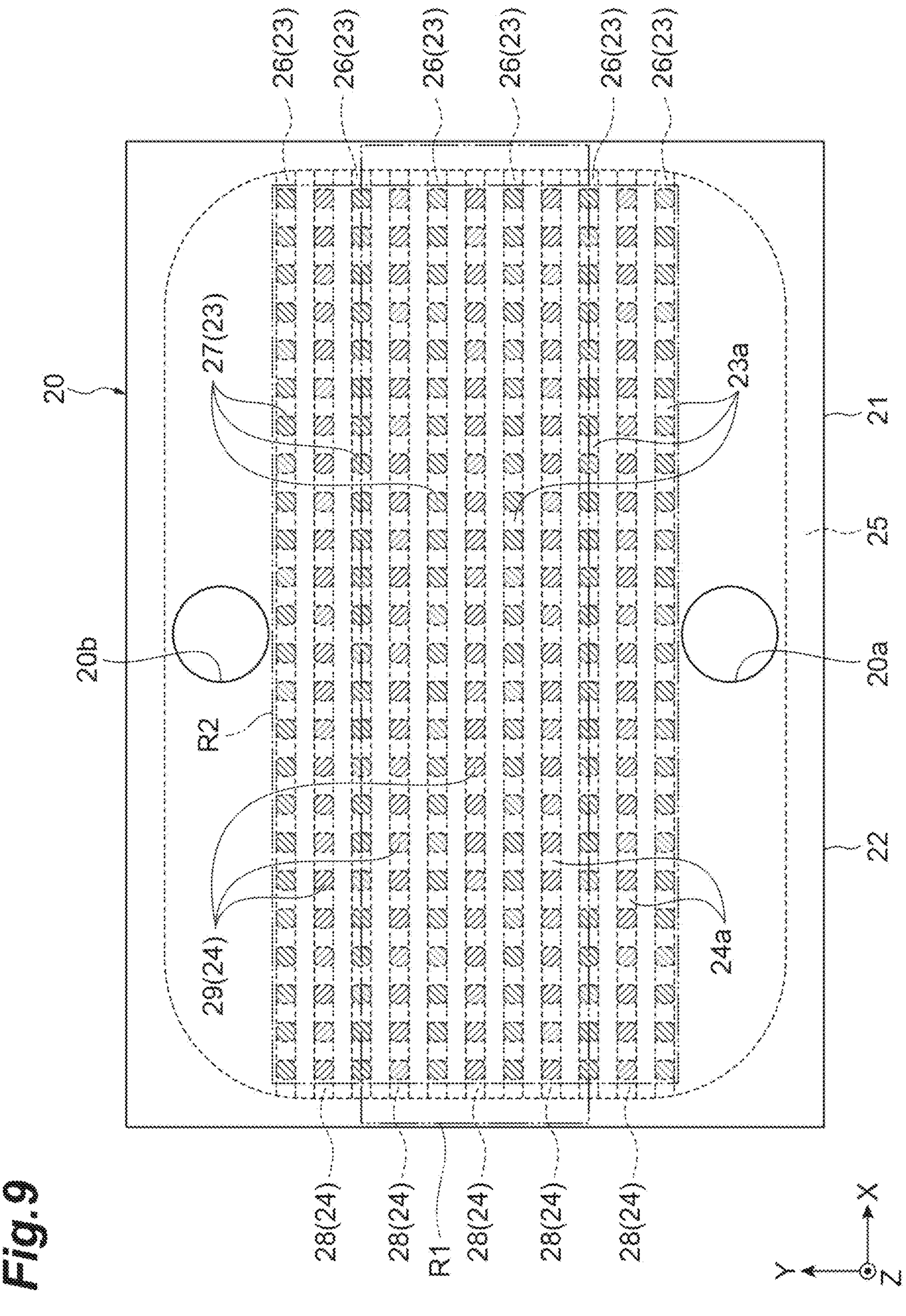
FIG. 9 is a plan view of a cooling section of a modification example.
Figure 10:
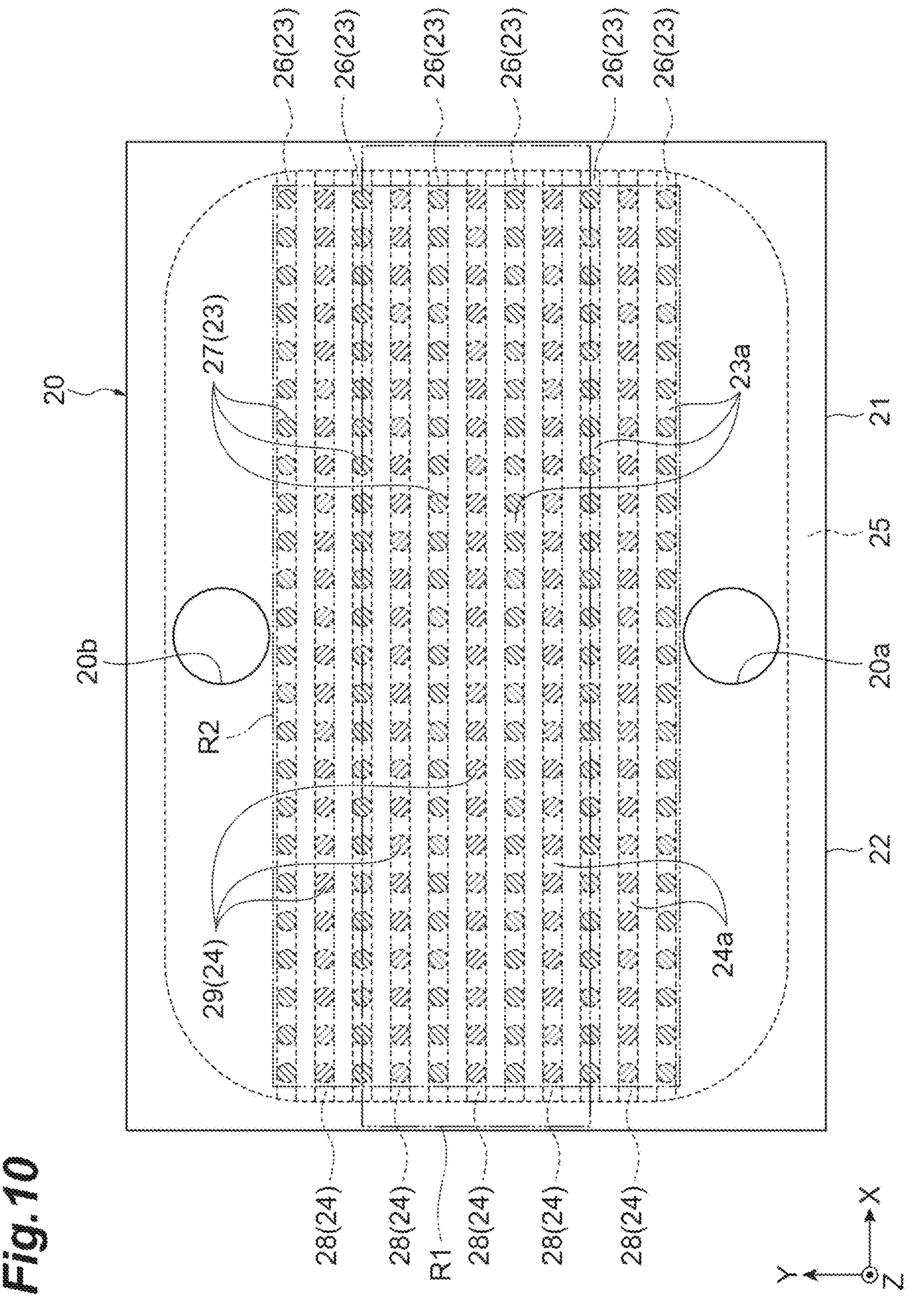
FIG. 10 is a plan view of a cooling section of a modification example.

As illustrated in FIG. 9, a corner of a side surface of each of the first protrusions 27, and a corner of a side surface of each of the second protrusions 29 may be chamfered in a round shape. In addition, as illustrated in FIG. 10, each of the first protrusions 27 and each of the second protrusions 29 may be formed in a circular column shape. According to the configurations, the coolant can be smoothly circulated in each of the first passage portions 23*a* and each of the second passage portions 24*a*.

Figure 11:
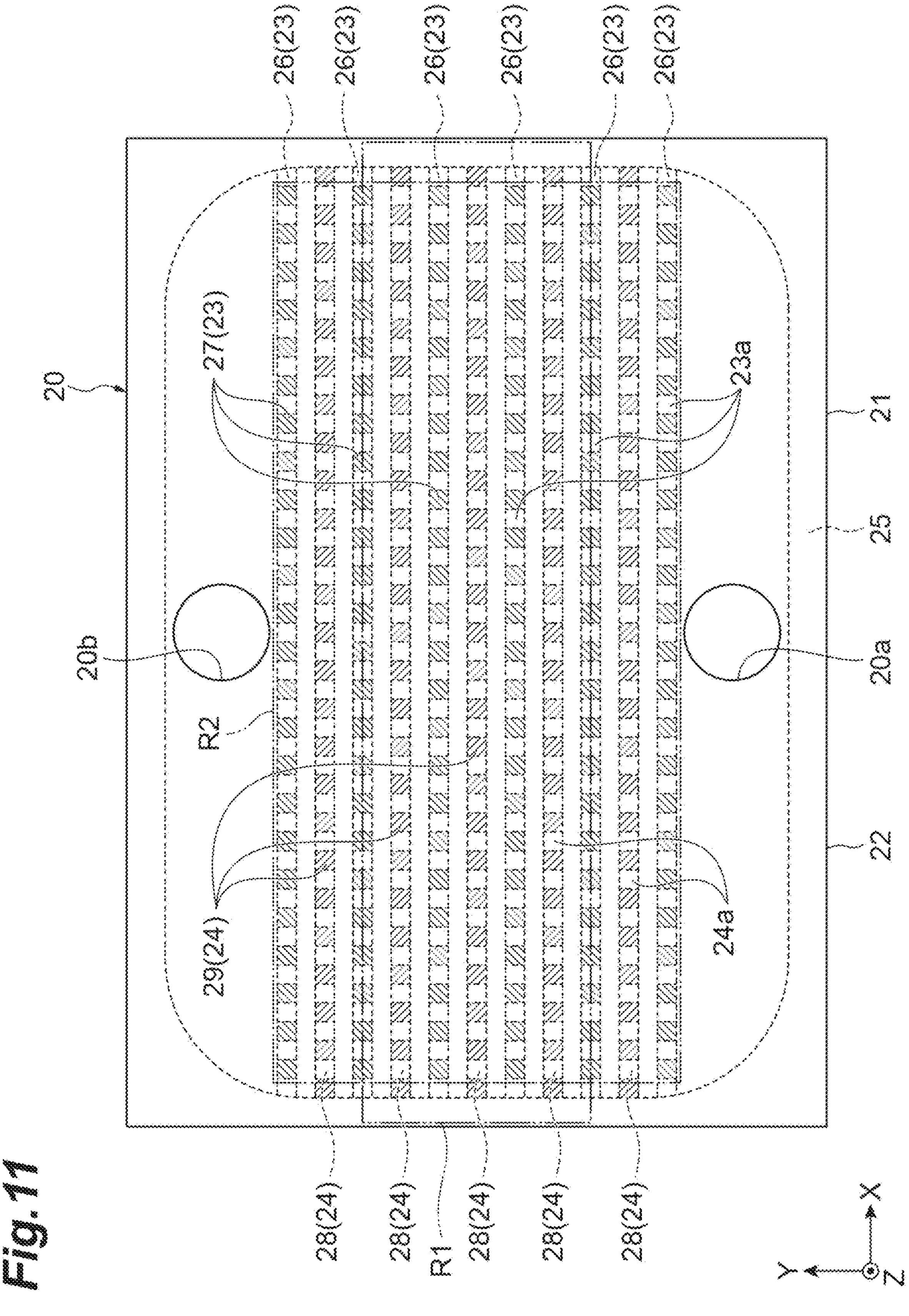
FIG. 11 is a plan view of a cooling section of a modification example.

As illustrated in FIG. 11, when viewed in the Z-direction, each of the first passage portions 23*a* and each of the second passage portions 24*a* may be alternately arranged in a zigzag shape along a line parallel to the Y-direction. According to this, since a flow direction of the coolant can be changed in a zigzag shape not only in the Z-direction but also the X-direction, a contact area with the coolant in the cooling section 20 increases, and turbulence is more likely to occur in the flow of the coolant. As a result, the cooling efficiency by the cooling section 20 can be more improved.

In the cooling section 20, the arrangement pitch of the plurality of first passage portions 23*a* in the X-direction, and the arrangement pitch of the plurality of second passage portions 24*a* in the X-direction may not be substantially equal to each other. As an example, the arrangement pitch of the plurality of first passage portions 23*a* in the X-direction, and the arrangement pitch of the plurality of second passage portions 24*a* in the X-direction may be sparser as approaching the inlet port 20*a* and the outlet port 20*b* (in other words, may be denser as being spaced apart from the inlet port 20*a* and the outlet port 20*b*). In this case, the plurality of light-emitting elements 11 can be more uniformly cooled.

Figure 12:
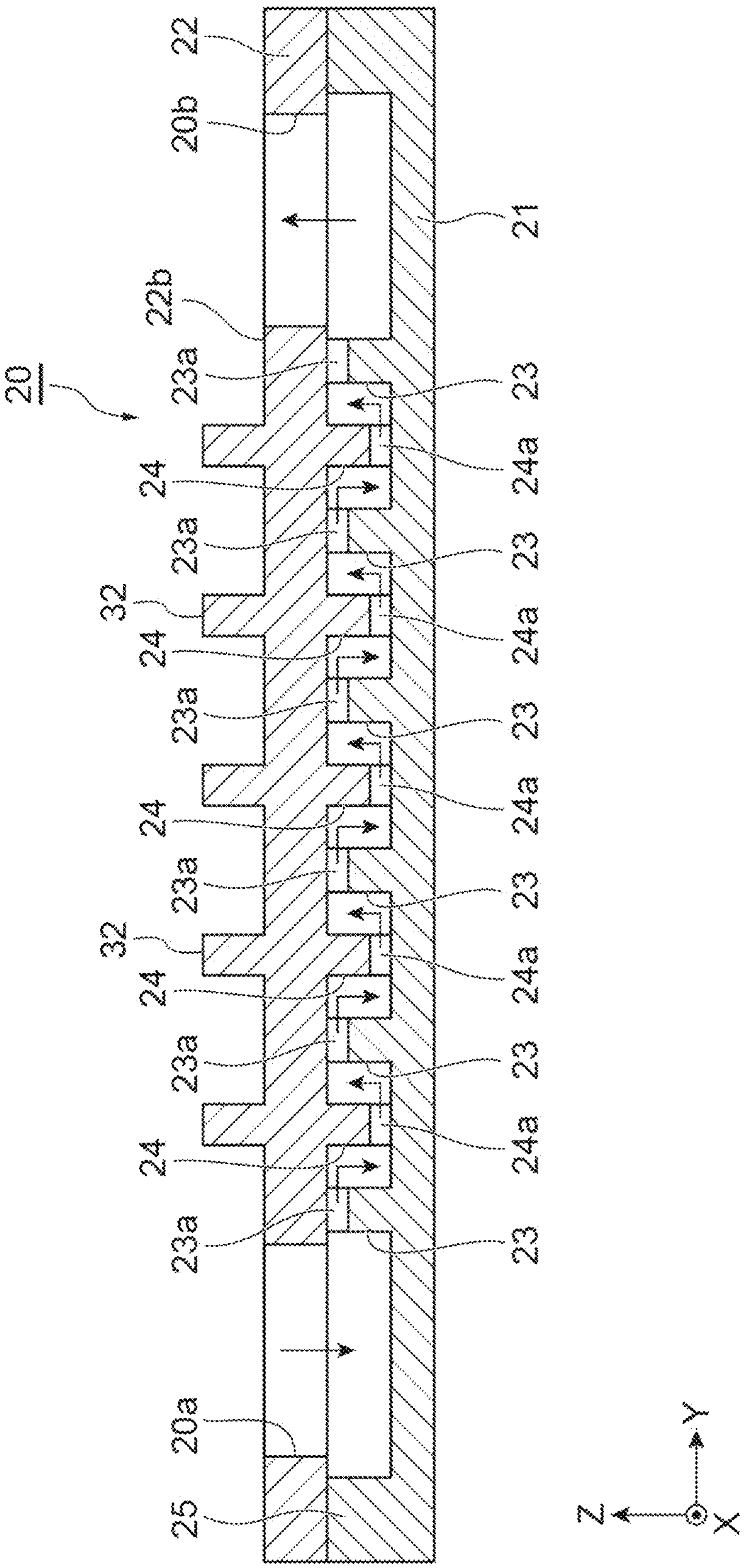
FIG. 12 is a cross-sectional view of a cooling section of a modification example along a plane perpendicular to the X-direction.

As illustrated in FIG. 12, the cooling section 20 may include a plurality of radiation fins 32. The plurality of radiation fins 32 are provided on a surface 22*b* on an opposite side of the second plate-shaped portion 22 from the first plate-shaped portion 21. According to this, since heat dissipation in the second plate-shaped portion 22 is improved, it is possible to efficiently and reliably transfer heat generated by the plurality of light-emitting elements 11 from the first plate-shaped portion 21 side to the second plate-shaped portion 22 side.

In the light irradiation device 1, when at least one of "the first passage portions 23*a* located at both ends among the plurality of first passage portions 23*a* arranged in the X-direction", and "the second passage portions 24*a* located at both ends among the plurality of second passage portions 24*a* arranged in the X-direction" face the frame portion 25, it is possible to effectively transfer heat generated by the plurality of light-emitting elements 11 from the frame portion 25 also to the coolant. In addition, in the light irradiation device 1, in a case where the inlet port 20*a* is formed in the first plate-shaped portion 21, a wall portion closest to the inlet port 20*a* in the Y-direction among the plurality of first wall portions 23 and the plurality of second wall portions 24 may be one of the second wall portions 24. According to this, when the coolant flowing in from the inlet port 20*a* formed in the first plate-shaped portion 21 heads toward the plurality of second passage portions 24*a* provided in the second wall portion 24 closest to the inlet port 20*a*, since a flow direction of the coolant is greatly changed, and a flow velocity of the coolant becomes uniform in the X-direction, the plurality of light-emitting elements 11 can be uniformly cooled.

The light irradiation device according to an aspect of the present disclosure is [1] "A light irradiation device including: a light irradiation section including a plurality of light-emitting elements being two-dimensionally arranged along a plane perpendicular to a first direction; and a cooling section including an inlet port and an outlet port and configured to cool down the plurality of light-emitting elements by circulating a coolant from the inlet port to the outlet port. The cooling section includes a first plate-shaped portion being thermally connected to the plurality of light-emitting elements, a second plate-shaped portion facing the first plate-shaped portion in the first direction, a plurality of first wall portions each extending between the first plate-shaped portion and the second plate-shaped portion in a second direction perpendicular to the first direction, and arranged in a third direction perpendicular to both the first direction and the second direction, a plurality of second wall portions each extending between the first plate-shaped portion and the second plate-shaped portion in the second direction, and arranged in the third direction, and a frame portion surrounding the plurality of first wall portions and the plurality of second wall portions between the first plate-shaped portion and the second plate-shaped portion. The inlet port is disposed on one side in the third direction with respect to the plurality of first wall portions and the plurality of second wall portions, the outlet port is disposed on the other side in the third direction with respect to the plurality of first wall portions and the plurality of second wall portions, each of the plurality of first wall portions and each of the plurality of second wall portions are alternately disposed in a state of being spaced apart from each other, each of the plurality of first wall portions is thermally connected to each of the first plate-shaped portion and the second plate-shaped portion, each of the plurality of second wall portions is thermally connected to each of the first plate-shaped portion and the second plate-shaped portion, the frame portion is thermally connected to each of the first plate-shaped portion and the second plate-shaped portion, each of the plurality of first wall portions includes a plurality of first passage portions through which the coolant passes, each of the plurality of second wall portions includes a plurality of second passage portions through which the coolant passes, the plurality of first passage portions are arranged in the second direction and are biased to the second plate-shaped portion side in the first direction, and the plurality of second passage portions arranged in the second direction and are biased to the first plate-shaped portion side in the first direction".

In the light irradiation device described in [1], each of the plurality of first wall portions and each of the plurality of second wall portions are alternately disposed in a state of being spaced apart from each other between the first plate-shaped portion and the second plate-shaped portion and on an inner side of the frame portion, in each of the plurality of first wall portions, the plurality of first passage portions are biased to the second plate-shaped portion side, and in each of the plurality of second wall portions, the plurality of second passage portions are biased to the first plate-shaped portion side. According to this, a flow velocity of the coolant from the inlet port to the outlet port becomes uniform, and as a result, a cooling effect by the cooling section becomes uniform along a plane perpendicular to the first direction. In addition, since a flow direction of the coolant can be changed in a zigzag shape in the first direction, a contact area with the coolant in the cooling section increases, and turbulence is likely to occur in the flow of the coolant. As a result, cooling efficiency by the cooling section is improved. In addition, in the light irradiation device described in [1], each of the plurality of first wall portions, each of the plurality of second wall portions, and the frame portion are thermally connected to each of the first plate-shaped portion and the second plate-shaped portion. According to this, heat generated by the plurality of light-emitting elements is easily transferred from the first plate-shaped portion side to the second plate-shaped portion side through each of the plurality of first wall portions, each of the plurality of second wall portions, and the frame portion. As a result, the cooling efficiency by the cooling section is improved. As described above, according to the light irradiation device described in [1], it is possible to uniformly cool down the plurality of light-emitting elements.

The light irradiation device according to the aspect of the present disclosure may be [2] "The light irradiation device according to [1], wherein each of the plurality of first wall portions includes a first main body portion extending in the second direction, and being thermally connected to the first plate-shaped portion, and a plurality of first protrusions arranged in the second direction, and each being thermally connected to the second plate-shaped portion, each of the plurality of first passage portions is a region between a pair of adjacent first protrusions among the plurality of first protrusions, each of the plurality of second wall portions includes a second main body portion extending in the second direction, and being thermally connected to the second plate-shaped portion, and a plurality of second protrusions arranged in the second direction, and each being thermally connected to the first plate-shaped portion, and each of the plurality of second passage portions is a region between a pair of adjacent second protrusions among the plurality of second protrusions". According to the light irradiation device described in [2], it is possible to realize a configuration in which in each of the plurality of first wall portions, the plurality of first passage portions are biased to the second plate-shaped portion side, and in each of the plurality of second wall portions, the plurality of second passage portions are biased to the first plate-shaped portion side with a simple structure.

The light irradiation device according to the aspect of the present disclosure may be [3] "The light irradiation device according to [2], wherein the first main body portion and the plurality of first protrusions are formed integrally with the first plate-shaped portion, each of the plurality of first protrusions is joined to the second plate-shaped portion with a brazing material, the second main body portion and the plurality of second protrusions are formed integrally with the second plate-shaped portion, each of the plurality of second protrusions is joined to the first plate-shaped portion with a brazing material, the frame portion is formed integrally with one of the first plate-shaped portion and the second plate-shaped portion, and the frame portion is joined to the other of the first plate-shaped portion and the second plate-shaped portion with a brazing material". According to the light irradiation device described in [3], it is possible to realize a configuration in which each of the plurality of first wall portions, each of the plurality of second wall portions, and the frame portion are thermally connected to each of the first plate-shaped portion and the second plate-shaped portion with a simple structure. In addition, it is possible to efficiently and reliably transfer heat generated by the plurality of light-emitting elements from the first plate-shaped portion side to the second plate-shaped portion side through each of the plurality of first wall portions, each of the plurality of second wall portions, and the frame portion.

The light irradiation device according to the aspect of the present disclosure may be [4] "The light irradiation device according to [2] or [3], wherein each of the plurality of first protrusions and each of the plurality of second protrusions are formed in a square column shape". According to the light irradiation device described in [4], since turbulence is likely to occur in the flow of the coolant, the cooling efficiency by the cooling section can be improved. In addition, the cooling section can be easily manufactured.

The light irradiation device according to the aspect of the present disclosure may be [5] "The light irradiation device according to any one of [1] to [4], wherein the thickness of the second plate-shaped portion is larger than the thickness of the first plate-shaped portion". According to the light irradiation device described in [5], heat capacity of the second plate-shaped portion becomes larger than heat capacity of the first plate-shaped portion, heat generated by the plurality of light-emitting elements can be efficiently and reliably transferred from the first plate-shaped portion to the second plate-shaped portion.

The light irradiation device according to the aspect of the present disclosure may be [6] "The light irradiation device according to any one of [1] to [5], wherein when viewed in the first direction, a region where the plurality of light-emitting elements are disposed is included in a region where the plurality of first wall portions and the plurality of second wall portions are disposed at least in the third direction". According to the light irradiation device described in [6], it is possible to efficiently and uniformly cool down the plurality of light-emitting elements.

The light irradiation device according to the aspect of the present disclosure may be [7] "The light irradiation device according to any one of [1] to [6], wherein the inlet port is formed in the second plate-shaped portion so as to face the first plate-shaped portion in the first direction". According to the light irradiation device described in [7], since the coolant flowing in from the inlet port flows so as to collide with the first plate-shaped portion, it is possible to cool down the plurality of light-emitting elements with further efficiency.

The light irradiation device according to the aspect of the present disclosure may be [8] "The light irradiation device according to any one of [1] to [7], wherein the cooling section further includes a plurality of radiation fins provided on a surface on an opposite side of the second plate-shaped portion from the first plate-shaped portion". According to the light irradiation device described in [8], since heat dissipation in the second plate-shaped portion is improved, it is possible to efficiently and reliably transfer heat generated by the plurality of light-emitting elements from the first plate-shaped portion side to the second plate-shaped portion side.

The light irradiation device according to the aspect of the present disclosure may be [9] "The light irradiation device according to any one of [1] to [8], wherein at least one of first passage portions located at both ends among the plurality of first passage portions arranged in the second direction and second passage portions located at both ends among the plurality of second passage portions arranged in the second direction face the frame portion". According to the light irradiation device described in [9], it is possible to effectively transfer heat generated by the plurality of light-emitting elements from the frame portion to the coolant.

The light irradiation device according to the aspect of the present disclosure may be [10] "The light irradiation device according to [9], wherein when viewed in the first direction, some light-emitting elements among the plurality of light-emitting elements overlap the frame portion". According to the light irradiation device described in [10], it is possible to broaden a light-emitting area of the light irradiation section by broadening the region where the plurality of light-emitting elements are disposed. In addition, it is possible to increase light-emission intensity of the light irradiation section as a whole by increasing an arrangement density of the plurality of light-emitting elements. In addition, in a case where a plurality of the light irradiation sections are arranged in an array shape, since a region where the light-emitting elements are sparsely arranged is less likely to occur between the light irradiation sections adjacent to each other, it is possible to obtain a uniform light-emission plane of the plurality of light irradiation sections as a whole.

The light irradiation device according to the aspect of the present disclosure may be [11] "The light irradiation device according to any one of [1] to [10], wherein in a case where the inlet port is formed in the second plate-shaped portion, among the plurality of first wall portions and the plurality of second wall portions, a wall portion closest to the inlet port in the third direction is one of the first wall portions, and in a case where the inlet port is formed in the first plate-shaped portion, among the plurality of first wall portions and the plurality of second wall portions, a wall portion closest to the inlet port in the third direction is one of the second wall portions". According to the light irradiation device described in [11], in a case where the inlet port is formed in the second plate-shaped portion, when the coolant flowing in from the inlet port heads toward the plurality of first passage portions provided in the first wall portion closest to the inlet port, since a flow direction of the coolant can be greatly changed, and a flow velocity of the coolant becomes uniform in the second direction, it is possible to more uniformly cool down the plurality of light-emitting elements. Similarly, in a case where the inlet port is formed in the first plate-shaped portion, when the coolant flowing in from the inlet port heads toward the plurality of second passage portions provided in the second wall portion closest to the inlet port, since the flow direction of the coolant can be greatly changed, and the flow velocity of the coolant becomes uniform in the second direction, it is possible to more uniformly cool down the plurality of light-emitting elements.

According to the present disclosure, it is possible to provide a light irradiation device capable of uniformly cooling down a plurality of light-emitting elements.

What is claimed is:

1. A light irradiation device, comprising:

a light irradiation section including a plurality of light-emitting elements being two-dimensionally arranged along a plane perpendicular to a first direction; and a cooling section including an inlet port and an outlet port, and configured to cool down the plurality of light-emitting elements by circulating a coolant from the inlet port to the outlet port, wherein the cooling section includes, a first plate-shaped portion being thermally connected to the plurality of light-emitting elements, a second plate-shaped portion facing the first plate-shaped portion in the first direction, a plurality of first wall portions each extending between the first plate-shaped portion and the second plate-shaped portion in a second direction perpendicular to the first direction, and arranged in a third direction perpendicular to both the first direction and the second direction, a plurality of second wall portions each extending between the first plate-shaped portion and the second plate-shaped portion in the second direction, and arranged in the third direction, and a frame portion surrounding the plurality of first wall portions and the plurality of second wall portions between the first plate-shaped portion and the second plate-shaped portion, the inlet port is disposed on one side in the third direction with respect to the plurality of first wall portions and the plurality of second wall portions, the outlet port is disposed on the other side in the third direction with respect to the plurality of first wall portions and the plurality of second wall portions, each of the plurality of first wall portions and each of the plurality of second wall portions are alternately disposed in a state of being spaced apart from each other, each of the plurality of first wall portions is thermally connected to each of the first plate-shaped portion and the second plate-shaped portion, each of the plurality of second wall portions is thermally connected to each of the first plate-shaped portion and the second plate-shaped portion, the frame portion is thermally connected to each of the first plate-shaped portion and the second plate-shaped portion, each of the plurality of first wall portions includes a plurality of first passage portions through which the coolant passes, each of the plurality of second wall portions includes a plurality of second passage portions through which the coolant passes, the plurality of first passage portions are arranged in the second direction and are biased to the second plate-shaped portion side in the first direction, and the plurality of second passage portions arranged in the second direction and are biased to the first plate-shaped portion side in the first direction.

2. The light irradiation device according to claim 1, wherein each of the plurality of first wall portions includes, a first main body portion extending in the second direction, and being thermally connected to the first plate-shaped portion, and a plurality of first protrusions arranged in the second direction, and each being thermally connected to the second plate-shaped portion, each of the plurality of first passage portions is a region between a pair of adjacent first protrusions among the plurality of first protrusions, each of the plurality of second wall portions includes, a second main body portion extending in the second direction, and being thermally connected to the second plate-shaped portion, and a plurality of second protrusions arranged in the second direction, and each being thermally connected to the first plate-shaped portion, and each of the plurality of second passage portions is a region between a pair of adjacent second protrusions among the plurality of second protrusions.

3. The light irradiation device according to claim 2, wherein the first main body portion and the plurality of first protrusions are formed integrally with the first plate-shaped portion, each of the plurality of first protrusions is joined to the second plate-shaped portion with a brazing material, the second main body portion and the plurality of second protrusions are formed integrally with the second plate-shaped portion, each of the plurality of second protrusions is joined to the first plate-shaped portion with a brazing material, the frame portion is formed integrally with one of the first plate-shaped portion and the second plate-shaped portion, and the frame portion is joined to the other of the first plate-shaped portion and the second plate-shaped portion with a brazing material.

4. The light irradiation device according to claim 2, wherein each of the plurality of first protrusions and each of the plurality of second protrusions are formed in a square column shape.

5. The light irradiation device according to claim 1, wherein the thickness of the second plate-shaped portion is larger than the thickness of the first plate-shaped portion.

6. The light irradiation device according to claim 1, wherein when viewed in the first direction, a region where the plurality of light-emitting elements are disposed is included in a region where the plurality of first wall portions and the plurality of second wall portions are disposed at least in the third direction.

7. The light irradiation device according to claim 1, wherein the inlet port is formed in the second plate-shaped portion so as to face the first plate-shaped portion in the first direction.

8. The light irradiation device according to claim 1, wherein the cooling section further includes a plurality of radiation fins provided on a surface on an opposite side of the second plate-shaped portion from the first plate-shaped portion.

9. The light irradiation device according to claim 1, wherein at least one of first passage portions located at both ends among the plurality of first passage portions arranged in the second direction and second passage portions located at both ends among the plurality of second passage portions arranged in the second direction faces the frame portion.

10. The light irradiation device according to claim 9, wherein when viewed in the first direction, some light-emitting elements among the plurality of light-emitting elements overlap the frame portion.

11. The light irradiation device according to claim 1, wherein in a case where the inlet port is formed in the second plate-shaped portion, among the plurality of first wall portions and the plurality of second wall portions, a wall portion closest to the inlet port in the third direction is one of the first wall portions, and in a case where the inlet port is formed in the first plate-shaped portion, among the plurality of first wall portions and the plurality of second wall portions, a wall portion closest to the inlet port in the third direction is one of the second wall portions.

* * * * *